United States Patent
Laukkanen et al.

(10) Patent No.: US 10,625,232 B2
(45) Date of Patent: Apr. 21, 2020

(54) TREATING NANOFIBRILLAR CELLULOSE HYDROGEL AT ELEVATED TEMPERATURE

(71) Applicant: UPM-KYMMENE CORPORATION, Helsinki (FI)

(72) Inventors: Antti Laukkanen, Helsinki (FI); Esa Laurinsilta, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 417 days.

(21) Appl. No.: 15/538,067

(22) PCT Filed: Dec. 21, 2015

(86) PCT No.: PCT/FI2015/050918
§ 371 (c)(1),
(2) Date: Jun. 20, 2017

(87) PCT Pub. No.: WO2016/102766
PCT Pub. Date: Jun. 30, 2016

(65) Prior Publication Data
US 2017/0348662 A1 Dec. 7, 2017

(30) Foreign Application Priority Data
Dec. 22, 2014 (FI) .................................. 20146139

(51) Int. Cl.
*B01J 13/00* (2006.01)
*C08L 1/02* (2006.01)

(52) U.S. Cl.
CPC ............. *B01J 13/0069* (2013.01); *C08L 1/02* (2013.01)

(58) Field of Classification Search
CPC ................................. B01J 13/0069; C08L 1/02
USPC ........................................................ 422/26, 28
See application file for complete search history.

(56) References Cited

U.S. PATENT DOCUMENTS

2014/0349377 A1* 11/2014 Lauraeus ................. C12N 1/22
435/253.6

FOREIGN PATENT DOCUMENTS

| EP | 1027835 A1 | 8/2000 |
|---|---|---|
| JP | 2006333740 A | 12/2006 |
| WO | 2012056109 A2 | 5/2012 |
| WO | 2013117823 A1 | 8/2013 |
| WO | 2014091086 A1 | 6/2014 |
| WO | 2014128354 A1 | 8/2014 |

OTHER PUBLICATIONS

Search Report from Patent Application No. 20146139 dated Apr. 21, 2015.
(Continued)

*Primary Examiner* — Kevin Joyner
(74) *Attorney, Agent, or Firm* — Nixon Peabody LLP

(57) ABSTRACT

The invention relates to a method for treating nanofibrillar cellulose hydrogel, wherein the method comprises the steps of: providing a nanofibrillar cellulose hydrogel; and subjecting the nanofibrillar cellulose hydrogel to heat treatment, wherein the heat treatment comprises keeping the nanofibrillar cellulose hydrogel at a temperature of at least 130° C. for at least 0.5 seconds, for reducing the number of viable micro-organisms in the nanofibrillar cellulose hydrogel.

14 Claims, 1 Drawing Sheet

(56) References Cited

OTHER PUBLICATIONS

International Search Report from International Application No. PCT/FI2015/050918 dated Mar. 29, 2016.
Madhushree Bhattacharya et al., "Nanofibrillar cellulose hydrogel promotes three-dimensional liver cell culture", Journal of Controlled Release, vol. 164, No. 3, Dec. 1, 2012.
Yan-Ru Lou et al., "The Use of Nanofibrillar Cellulose Hydrogel as a Flexible Three-Dimensional Model to Culture Human Pluripotent Stem Cells", Stem Cells and Development, vol. 23, No. 4, Feb. 15, 2014.
International Preliminary Report on Patentability from International Application No. PCT/FI2015/050918 dated Mar. 9, 2017.

* cited by examiner

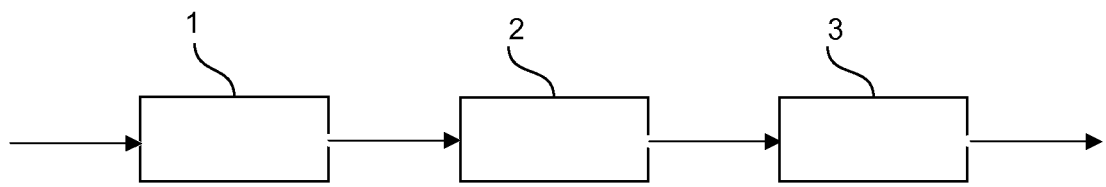

TREATING NANOFIBRILLAR CELLULOSE HYDROGEL AT ELEVATED TEMPERATURE

CROSS-REFERENCE TO RELATED APPLICATIONS

This application is a U.S. National Stage of International Application No. PCT/FI2015/050918, filed on Dec. 21, 2015, which claims priority to Finnish Patent No. 20146139, filed Dec. 22, 2014, the contents of each of which are incorporated herein by reference in their entireties.

FIELD OF THE INVENTION

The invention relates to a method for treating nanofibrillar cellulose hydrogel. The invention further relates a nanofibrillar cellulose hydrogel, to a system for treating a nanofibrillar cellulose hydrogel, and to the use of the nanofibrillar cellulose hydrogel.

BACKGROUND OF THE INVENTION

A nanofibrillar cellulose hydrogel has been found use in different applications such as in cosmetics and pharmaceuticals as well as in cell growth medium. However, the use thereof in cosmetic or pharmaceutical products or devices put challenges on ensuring that the hydrogel is aseptic or sterile as well as on its other properties that may be affected by the used sterilization procedure.

Generally, sterilization efficiency is defined as the ability to remove or destroy all forms of microbial life, including viruses, bacteria and fungi, under vegetative forms or spores. However, since absolute sterility cannot be verified, the statistical definition of sterility is used in practice, by using the security assurance level (SAL), defined as "the probability of a single viable micro-organism occurring in or on a product after sterilization". The worldwide accepted definition of sterility of medical devices is defined as the chance of finding a viable organism in or on a medical device to be at most 1 in 1000000 or an SAL of at most $10^{-6}$.

The number of viable micro-organisms in nanofibrillar cellulose hydrogel can be reduced or eliminated by subjecting the hydrogel to autoclaving for 20 minutes at a temperature of 121° C. Autoclaving, however, has some challenges as it affects the properties, such as viscosity, of the hydrogel.

The inventors have therefore recognized the need for a method to treat nanofibrillar cellulose hydrogel such that it is suitable for further applications.

Purpose of the Invention

The purpose of the invention is to provide a new type of a method for treating a nanofibrillar cellulose hydrogel. Further the purpose of the invention is to provide a new type of nanofibrillar cellulose hydrogel and new uses of nanofibrillar cellulose hydrogel. Further the purpose of the invention is to provide a new system for treating a nanofibrillar cellulose hydrogel.

SUMMARY

The method according to the present invention is characterized by what is presented in claim 1.

The nanofibrillar cellulose hydrogel according to the present invention is characterized by what is presented in claim 16 or 21.

The system according to the present invention is characterized by what is presented in claim 17.

The use of a heat treatment according to the present invention is characterized by what is presented in claim 20.

The uses of the nanofibrillar cellulose hydrogel are characterized by what is presented in claim 22 or 23.

BRIEF DESCRIPTION OF THE DRAWINGS

The accompanying drawing, which is included to provide a further understanding of the invention and constitutes a part of this specification, illustrate an embodiment of the invention and together with the description help to explain the principles of the invention. In the drawing:

FIG. 1 is a flow chart illustration of the system according to one embodiment of the present invention.

DETAILED DESCRIPTION OF THE INVENTION

The present invention relates to a method for treating a nanofibrillar cellulose hydrogel, wherein the method comprises the steps of: providing a nanofibrillar cellulose hydrogel; and subjecting the nanofibrillar cellulose hydrogel to heat treatment, wherein the heat treatment comprises keeping the nanofibrillar cellulose hydrogel at a temperature of at least 130° C. for at least 0.5 seconds, for reducing the number of viable micro-organisms in the nanofibrillar cellulose hydrogel.

In one embodiment, the method for treating a nanofibrillar cellulose hydrogel comprises the steps of: providing a nanofibrillar cellulose hydrogel having a dry-matter content of at least 0.6 weight-%; and subjecting the nanofibrillar cellulose hydrogel to a heat treatment, wherein the heat treatment comprises keeping the nanofibrillar cellulose hydrogel at a temperature of at least 130° C. for at least 0.5 seconds, for reducing the number of viable micro-organisms in the nanofibrillar cellulose hydrogel.

The present invention further relates to a system for treating a nanofibrillar cellulose hydrogel, wherein the system comprises: a fibrillation unit for providing a nanofibrillar cellulose hydrogel, wherein the fibrillation unit is configured to fibrillate a cellulose-based raw material; and a heating apparatus for subjecting the nanofibrillar cellulose hydrogel to a heat treatment, wherein the heating apparatus is configured to keep the nanofibrillar cellulose hydrogel at a temperature of at least 130° C. for at least 0.5 seconds, for reducing the number of viable micro-organisms in the nanofibrillar cellulose hydrogel.

In one embodiment, the system for treating a nanofibrillar cellulose hydrogel comprises: a fibrillation unit for providing a nanofibrillar cellulose hydrogel, wherein the fibrillation unit is configured to fibrillate a cellulose-based raw material; and a heating apparatus for subjecting the nanofibrillar cellulose hydrogel to a heat treatment, wherein the heating apparatus is configured to keep the nanofibrillar cellulose hydrogel at a temperature of at least 130° C. for at least 0.5 seconds, for reducing the number of viable micro-organisms in the nanofibrillar cellulose hydrogel, and wherein the fibrillation unit and the heating apparatus are configured to maintain aseptic conditions.

In one embodiment, when the system is in use, the fibrillation unit fibrillates the cellulose-based raw material. In one embodiment, when the system is in use, the heating apparatus keeps the nanofibrillar cellulose hydrogel at a temperature of at least 130° C. for at least 0.5 seconds.

The present invention further relates to the use a heat treatment for reducing the number of viable micro-organism in nanofibrillar cellulose hydrogel, wherein the heat treatment comprises keeping the nanofibrillar cellulose hydrogel at a temperature of at least 130° C. for at least 0.5 seconds.

In one embodiment, the heat treatment is used for reducing the number of viable micro-organisms in a nanofibrillar cellulose hydrogel having a dry-matter content of at least 0.6 weight-%, wherein the heat treatment comprises keeping the nanofibrillar cellulose hydrogel at a temperature of at least 130° C. for at least 0.5 seconds.

In one embodiment, the heat treatment comprises keeping the nanofibrillar cellulose hydrogel at a temperature of at least 133° C., or of at least 135° C., for at least 0.5 seconds.

The operating pressures are to be selected so that the desired temperature is reached and the nanofibrillar cellulose hydrogel is not boiling in the used temperature. Nanofibrillar cellulose itself is not a volatile component and it does not boil. In one embodiment, the pressure is higher than vapor pressure of water in the nanofibrillar cellulose hydrogel in the desired temperature.

The inventor of the present invention surprisingly found out that treating the nanofibrillar cellulose hydrogel at a rather high temperature for a rather short period of time has the effect of reducing or eliminating the number of viable micro-organisms in the hydrogel without compromising, in an adverse extent, the other properties, such as the viscosity, of the nanofibrillar cellulose hydrogel, which would affect its suitability to be further used in e.g. cosmetic or pharmaceutical products or devices. The inventor of the present invention found out that the heat treatment at a high temperature for a short period of time may not affect the viscosity of the hydrogel in a similar manner as e.g. autoclaving does.

The expression "hydrogel" or "nanofibrillar cellulose hydrogel" should be understood in this specification, unless otherwise stated, as referring to an aqueous dispersion of nanofibrillar cellulose having a continuous or discontinuous gel structure. By a "discontinuous" gel structure is to be understood a continuous gel, which is broken into pieces. The hydrogel can be formed by combining nanofibrillar cellulose with e.g. water, buffer solution, cell culture medium or any other aqueous solution optionally supplemented with additives. The storage modulus (G') value of the nanofibrillar cellulose hydrogel is greater than its loss modulus (G") value, i.e. the loss tangent is below 1 at least up to strain value 10%. The storage modulus G', loss modulus G" and loss tangent (G"/G') of nanofibrillar cellulose hydrogels can be determined with the frequency sweep in dynamic oscillation mode of the rheometer (strain 1% and 10%, frequency 0.1-100, temperature 25° C., pH 7.0). Stress sweep is measured in a shear stress range of 0.001-100 Pa at the frequency of 0.1 Hz, and at a temperature of 25° C. and at pH 7. For characterizing the gel forming capacity of nanofibrillar cellulose the measurement is performed in 0.5 weight-%, 1% strain, and frequency of 0.1 Hz. For determining whether a certain material is a gel, i.e. whether its loss tangent is below 1, the measurement is performed in the same way except in the material's consistency. The storage modulus of oxidized nanofibrillar celluloses may vary from 1 to 100 Pa, or from 2 to 50 Pa, or from 5 to 20 Pa, in water at 0.5 weight-% concentration.

The expression "nanofibrillar cellulose" or "NFC" should be understood in this specification, unless otherwise stated, as referring to a collection of isolated cellulose nanofibrils (CNF) or nanofibril bundles derived from cellulose-based raw material.

The fibrils can be isolated from cellulose based raw material. The expression "cellulose-based raw material" should be understood in this specification, unless otherwise stated, as referring to any raw material source that contains cellulose and from which nanofibrillar cellulose can be produced.

In one embodiment, the cellulose-based raw material is based on any plant material that contains cellulose. Plant material may be wood. Wood can be from softwood tree such as spruce, pine, fir, larch, douglas-fir or hemlock, or from hardwood tree such as birch, aspen, poplar, alder, *eucalyptus* or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

In one embodiment, the cellulose-based raw material is derived from a bacterial fermentation process. In one embodiment, the cellulose based raw material is derived from cellulose-producing micro-organism. The micro-organisms can be of the genus *Acetobacter, Agrobacterium, Rhizobium, Pseudomonas* or *Alcaligenes*, preferably of the genus *Acetobacter*, and more preferably of the species *Acetobacter xylinum* or *Acetobacter pasteurianus*.

Nanofibrils typically have a high aspect ratio. The length might exceed one micrometer while the diameter is typically below 200 nm. The smallest nanofibrils are similar to so called elementary fibrils, which are typically 2-12 nm in diameter. The dimensions of the fibrils or fibril bundles are dependent on raw material and disintegration method. The number average diameter of nanofibrillar cellulose may vary from 1 to 100 nm, such as from 1 to 50 nm, or from 2 to 15 nm. Typically, native or non-derivatized grades have larger diameters and wider fibril size distribution while derivatized grades have smaller diameters and narrower size distributions. Fibril thickness and width distribution may be measured by image analysis of images from a field emission scanning electron microscope (FE-SEM), a transmission electron microscope (TEM), such as a cryogenic transmission electron microscope (cryo-TEM), or an atomic force microscope (AFM).

Nanofibrillar cellulose is characterized by very high water retention values, a high degree of chemical accessibility and the ability to form stable gels, hydrogels, in water or other polar solvents. Nanofibrillar cellulose product is typically a dense network of highly fibrillated cellulose. In an aqueous environment, a dispersion of cellulose nanofibers forms a viscoelastic hydrogel network. The hydrogel is formed at relatively low concentrations of for example 0.05-0.2% w/w by dispersed and hydrated entangled fibrils.

In one embodiment, the step of providing a nanofibrillar cellulose hydrogel comprises providing a nanofibrillar cellulose hydrogel having a dry-matter content of at least 0.6 weight-%, or at least 0.7 weight-%, or at least 0.8 weight-%, or at least 0.9 weight-%, or at least 1 weight-%. In one embodiment, the step of providing a nanofibrillar cellulose hydrogel comprises providing a nanofibrillar cellulose hydrogel having a dry-matter content of at most 4 weight-%, or at most 3 weight-%, or at most 2 weight-%.

In one embodiment, the nanofibrillar cellulose hydrogel to be subjected to heat treatment has a dry-matter content of at least 0.6 weight-%, or at least 0.7 weight-%, or at least 0.8 weight-%, or at least 0.9 weight-%, or at least 1 weight-%. In one embodiment, the nanofibrillar cellulose hydrogel to be subjected to heat treatment has a dry-matter content of at most 4 weight-%, or at most 3 weight-%, or at most 2 weight-%.

In one embodiment, the nanofibrillar cellulose hydrogel to be subjected to heat treatment has a dry-matter content of 0.6-4 weight-%, or 0.7-3 weight-%, or 0.8-2 weight-%.

In one embodiment, the heat treatment comprises: heating the nanofibrillar cellulose hydrogel up to a temperature of at least 130° C. in at most 5 seconds; and keeping the nanofibrillar cellulose hydrogel at a temperature of at least 130° C. for at least 0.5 seconds.

In one embodiment, the heat treatment comprises: heating the nanofibrillar cellulose hydrogel up to a temperature of at least 133° C. in at most 5 seconds; and keeping the nanofibrillar cellulose hydrogel at a temperature of at least 133° C. for at least 0.5 seconds.

In one embodiment, the heat treatment comprises: heating the nanofibrillar cellulose hydrogel up to a temperature of at least 135° C. in at most 5 seconds; and keeping the nanofibrillar cellulose hydrogel at a temperature of at least 135° C. for at least 0.5 seconds.

In one embodiment, the method comprises, after the heat treatment, the step of cooling the nanofibrillar cellulose hydrogel to a temperature of below 30° C. in at most 120 seconds. In one embodiment, the nanofibrillar cellulose hydrogel is packed after the step of cooling the nanofibrillar cellulose hydrogel. The cooling has the effect of preventing evaporation of water from the nanofibrillar cellulose hydrogel after it has been packed for storage or for further use. In one embodiment, the heat treatment comprises keeping the nanofibrillar cellulose hydrogel at a temperature of 130-150° C. for at most 30 seconds, or at most 15 seconds, or at most 4 seconds, or for 1-2 seconds. In one embodiment the heat treatment comprises keeping the nanofibrillar cellulose hydrogel at a temperature of 130-150° C. for at most 30 seconds. In one embodiment the heat treatment comprises keeping the nanofibrillar cellulose hydrogel at a temperature of 130-150° C. for at most 15 seconds. In one embodiment the heat treatment comprises keeping the nanofibrillar cellulose hydrogel at a temperature of 130-150° C. for at most 4 seconds. In one embodiment the heat treatment comprises keeping the nanofibrillar cellulose hydrogel at a temperature of 130-150° C. for 1-2 seconds.

In one embodiment, the heat treatment comprises keeping the nanofibrillar cellulose hydrogel at a temperature of 133-150° C. for at most 30 seconds, or at most 15 seconds, or at most 4 seconds, or for 1-2 seconds. In one embodiment the heat treatment comprises keeping the nanofibrillar cellulose hydrogel at a temperature of 133-150° C. for at most 30 seconds. In one embodiment the heat treatment comprises keeping the nanofibrillar cellulose hydrogel at a temperature of 133-150° C. for at most 15 seconds. In one embodiment the heat treatment comprises keeping the nanofibrillar cellulose hydrogel at a temperature of 133-150° C. for at most 4 seconds. In one embodiment the heat treatment comprises keeping the nanofibrillar cellulose hydrogel at a temperature of 133-150° C. for 1-2 seconds.

In one embodiment, the heat treatment comprises keeping the nanofibrillar cellulose hydrogel at a temperature of 135-150° C. for at most 30 seconds, or at most 15 seconds, or at most 4 seconds, or for 1-2 seconds. In one embodiment the heat treatment comprises keeping the nanofibrillar cellulose hydrogel at a temperature of 135-150° C. for at most 30 seconds. In one embodiment the heat treatment comprises keeping the nanofibrillar cellulose hydrogel at a temperature of 135-150° C. for at most 15 seconds. In one embodiment the heat treatment comprises keeping the nanofibrillar cellulose hydrogel at a temperature of 135-150° C. for at most 4 seconds. In one embodiment the heat treatment comprises keeping the nanofibrillar cellulose hydrogel at a temperature of 135-150° C. for 1-2 seconds.

In one embodiment, the method comprises an additional sterilization treatment before the heat treatment. In one embodiment the additional sterilization treatment comprises an additional heat treatment.

In one embodiment, the nanofibrillar cellulose hydrogel to be subjected to the heat treatment contains at most $10^6$ colony-forming units of a viable micro-organism per gram of nanofibrillar cellulose hydrogel, or at most $10^4$ colony-forming units of a viable micro-organism per gram of nanofibrillar cellulose hydrogel, or at most $10^3$ colony-forming units of a viable micro-organism per gram of nanofibrillar cellulose hydrogel. In one embodiment, the nanofibrillar cellulose hydrogel to be subjected to the heat treatment may contain essentially only aerobic microorganisms. Anaerobes may not be commonly found in nanofibrillar cellulose hydrogels, especially not in wood-derived nanofibrillar cellulose hydrogels.

In one embodiment, the number of viable micro-organisms in the nanofibrillar cellulose hydrogel is reduced by a factor of at least $10^3$, or at least $10^6$, or at least $10^{12}$. In one embodiment the number of viable micro-organisms in the nanofibrillar cellulose hydrogel is reduced by a factor of at least $10^3$. In one embodiment the number of viable micro-organisms in the nanofibrillar cellulose hydrogel is reduced by a factor of at least $10^6$. In one embodiment the number of viable micro-organisms in the nanofibrillar cellulose hydrogel is reduced by a factor of at least $10^{12}$. Pharmaceutical products and medical devices may require sterility of the material or may require that the material is aseptic. As above indicated as absolute sterility cannot be verified, the statistical definition of sterility is used in practice, by using the security assurance level (SAL), defined as "the probability of a single viable micro-organism occurring in or on a product after sterilization". The expression "sterility of the hydrogel" or "sterile" should be understood in this specification, unless otherwise stated, as referring to a nanofibrillar cellulose hydrogel comprising fewer than 1 cfu (colony-forming units), or fewer than $10^{-1}$ cfu, or fewer than $10^{-2}$ cfu, or fewer than $10^{-3}$ cfu, or fewer than $10^{-4}$ cfu, or fewer than $10^{-5}$ cfu, or fewer than $10^{-6}$ cfu of a viable microorganism per gram of the nanofibrillar cellulose hydrogel. In other words, if the nanofibrillar cellulose hydrogel comprises fewer than $10^{-6}$ cfu of a viable microorganism per gram of the nanofibrillar cellulose hydrogel, there is a probability of not more than one viable microorganism in one million grams of the nanofibrillar cellulose hydrogel. A "colony-forming unit" is a term that describes the formation of a single macroscopic colony after the introduction of one or more microorganisms to microbiological growth media. One colony forming unit is expressed as 1 CFU.

In one embodiment, the heat treatment is carried out by contacting the nanofibrillar cellulose hydrogel with steam. In one embodiment, the heat treatment can be carried out by so-called direct heating methods, such as steam injection or steam infusion, wherein the nanofibrillar cellulose hydrogel is mixed with heating steam. In one embodiment, the heating apparatus is configured to contact the nanofibrillar cellulose hydrogel with steam.

In one embodiment, the heat treatment is carried out by so-called indirect heating method, using e.g. a plate heat exchanger or a tubular heat exchanger, which keep the nanofibrillar cellulose hydrogel and the heating medium separate with a barrier between them. In one embodiment the heating apparatus is a heat exchanger.

In one embodiment, the heat treatment and/or the step of cooling the nanofibrillar cellulose hydrogel are/is carried out in at least one heat exchanger.

In one embodiment, the heating apparatus is configured to heat the nanofibrillar cellulose up to a temperature of at least 130° C. in at most 0.5 seconds. In one embodiment, the heating apparatus is configured to heat the nanofibrillar cellulose up to a temperature of at least 133° C. in at most 0.5 seconds. In one embodiment, the heating apparatus is configured to heat the nanofibrillar cellulose up to a temperature of at least 135° C. in at most 0.5 seconds.

In one embodiment the system comprises a cooling apparatus for cooling the nanofibrillar cellulose hydrogel to a temperature of below 30° C. in at most 120 seconds. In one embodiment the cooling apparatus is a heat exchanger. In one embodiment the system comprises a cooling apparatus, which is configured to cool the nanofibrillar cellulose hydrogel to a temperature of below 30° C. in at most 120 seconds.

In one embodiment the heating apparatus and the cooling apparatus is the same apparatus. In one embodiment the heating apparatus and the cooling apparatus are different apparatuses.

In one embodiment, the system comprises a packaging unit for packaging the treated nanofibrillar cellulose hydrogel. In one embodiment, the packaging unit is configured to package the treated nanofibrillar cellulose hydrogel. In one embodiment, the packaging unit packages the treated nanofibrillar cellulose hydrogel when in use.

In one embodiment, the nanofibrillar cellulose is native nanofibrillar cellulose or anionic nanofibrillar cellulose. Anionic nanofibrillar cellulose can be formed by pretreatment replacing at least part of the hydroxyl groups of cellulose with carboxyl groups. In one embodiment, of 10-15% of the hydroxyl groups of cellulose are replaced with carboxyl groups. In one embodiment, the anionic nanofibrillar cellulose is formed by oxidation of cellulose pulp fiber.

Typically, native nanofibrillar cellulose has wider fibril diameter while the chemically modified, anionic nanofibrillar cellulose is much thinner and has a continuous network. The number average fibril diameter of the cellulose nanofibril is suitably from 1-200 nm, preferably the number average fibril diameter of native grades is 1-100 nm, and in chemically modified, anionic grades 1-20 nm. Size distribution is also narrower for the modified grades.

In one embodiment, the method comprises providing a nanofibrillar cellulose hydrogel having a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm.

In one embodiment, the method comprises providing anionic nanofibrillar cellulose hydrogel having a viscosity of 12000-30000 mPa·s as measured at a 0.8% (w/w) concentration of the nanofibrillar cellulose in water with a Brookfield viscometer at a temperature of 20° C., with a vane spindle and a measuring speed of 10 rpm.

The dry matter content (DSC) can be determined by keeping a sample in an oven at a temperature of 105° C. overnight (t=16 h) and by weighting the sample before and after it is kept in the oven. The weighting process is conducted following standard ISO 4119/1995 "Determination of stock concentration", with the difference that the time is 16 h.

The so-called Brookfield viscosity measurement can be determined in the following manner: A vane spindle (number 73) is selected and the Brookfield-viscosity measuring apparatus (Brookfield RVDV-III) is started. A sample of the nanofibrillar cellulose is diluted to a concentration of 0.8% by weight in water and mixed for 10 minutes using a propel mixer 700-800 rpm. No ultrasound mixing is used for modified grades, such as anionic nanofibrillar cellulose. The diluted sample mass is added to a 250 ml beaker and the temperature is adjusted to 20° C.±1° C., heated if necessary and mixed. The spindle is inserted in the beaker and measuring is started. The program registers 300 points starting with 0.5 rpm speed, then 300 points with 5 rpm and 10 rpm, and 100 points with 50 rpm and 100 rpm speeds. Relative viscosity is measured from each sample mass twice. Mean value and standard deviation are calculated for each sample, from results obtained from parallel measurements during last 5 seconds.

In one embodiment, method comprises providing a nanofibrillar cellulose hydrogel with a turbidity value of at most 200 NTU, or at most 90 NTU, or at most 40 NTU, as measured at a 0.1% (w/w) concentration of the nanofibrillar cellulose in water. In one embodiment, the method comprises providing a nanofibrillar cellulose hydrogel with a turbidity value of 1 to 200 NTU, or 1 to 90 NTU, or 10 to 40 NTU, as measured at a 0.1% (w/w) concentration of the nanofibrillar cellulose in water. In one embodiment, method comprises providing a nanofibrillar cellulose hydrogel with a turbidity value of 50 to 500 NTU, or 100 to 150 NTU as measured at a 0.1% (w/w) concentration of the nanofibrillar cellulose in water.

A turbidometric method based on nephelometry (90° angle between light source and detector) can be used for measuring the turbidity of samples. HACH P2100 Turbidometer, with a 50 ml measuring vessel is used for turbidity measurements. The calibration of the apparatus is checked and controlled with standard calibration bottles/samples. The dry matter of the nanofibrillar cellulose sample is determined and 0.5 g of the sample, calculated as dry matter, is loaded in the measuring vessel, which is filled with tap water to 500 g and vigorously mixed by shaking for about 30 s. Without delay the aqueous mixture is divided into 5 measuring vessels, which are inserted in the turbidometer. Three measurements on each vessel are carried out. Mean value and standard deviation are calculated for each sample.

In one embodiment, the viscosity of the nanofibrillar cellulose hydrogel, after the heat treatment, differs at most 50%, or at most 30%, or at most 10%, or at most 5%, from the viscosity of the nanofibrillar cellulose hydrogel before the heat treatment, when the dry matter content of the nanofibrillar cellulose hydrogel subjected to the heat treatment is at least 0.6 weight-% and when the viscosity after the heat treatment is measured in the same dry matter content of at least 0.6 weight. I.e. the viscosity is measured in the same dry matter content before and after the heat treatment. The inventor of the present invention surprisingly found out that the heat treatment may not affect the viscosity of the hydrogel in an adverse manner in view of its further use in e.g. pharmaceutical or cosmetic products, or in cell culture.

In one embodiment, providing the nanofibrillar cellulose hydrogel comprises fibrillation of cellulose-based raw material. In one embodiment the nanofibrillar cellulose hydrogel is provided by fibrillation of cellulose pulp or refined pulp. Cellulose pulp can be used as cellulose-based raw material. Cellulose pulp can be formed by isolating cellulose fibers from raw material that contains cellulose by chemical, mechanical, thermo-mechanical, or chemithermo mechanical pulping processes, e.g. kraft pulping, sulfate pulping, soda pulping, organosolv pulping, and by conventional bleaching processes. In one embodiment fibrillation of cellulose-based raw material is carried out with a refiner, grinder, homogenizer, colloider, friction grinder, ultrasound sonicator, fluidizer such as microfluidizer, macrofluidizer or fluidizer-type homogenizer. In one embodiment of the present invention the step of pre-refining cellulose-based raw material is preceded the step of fibrillating the cellulose-based raw material.

The dimensions of the fibrils or fibril bundles of the nanofibrillar cellulose are dependent on the raw material and the fibrillation method. The term fibrillation may be used interchangeably with expression disintegration, and generally refers to disintegrating cellulose-based raw material mechanically by work applied to the fibers, where cellulose fibrils are liberated from the fibers or fiber fragments. The work may be based on various effects, like grinding, crushing or shearing, or a combination of these, or another corresponding action that delaminates the cell walls of the fibers and liberates fibrils. The energy taken by the refining work is normally expressed in terms of energy per processed raw material quantity, in units of e.g. kWh/kg, MWh/ton, or units proportional to these. The disintegration is performed at conditions wherein water is sufficiently present to prevent the formation of bonds between the fibers.

Depending on the source of raw material, different polysaccharide composition may exist in the formed nanofibrillar cellulose hydrogel. Nanofibrillar celluloses may contain hemicelluloses and lignin in varying amounts, depending on the plant source and pulping conditions. In one embodiment, the cellulose-based raw material does not contain substantial amounts of lignin. In one embodiment, the nanofibrillar cellulose is essentially free of lignin.

In one embodiment providing the nanofibrillar cellulose hydrogel and subjecting the nanofibrillar cellulose hydrogel to heat treatment are carried out while maintaining aseptic conditions. In one embodiment, the fibrillation unit and the heating apparatus are configured to maintain aseptic conditions. Maintaining aseptic conditions may refer to keeping the method for treating nanofibrillar cellulose hydrogel in a closed environment so that the product is transported in pipelines from one production step to the next. Ventilation air and dilution water used should be sterile. E.g. aseptic processing rooms in which air supply, materials, and/or equipment are regulated to control microbial and particle contamination can be used. In one embodiment, the "aseptic conditions" refers to the conditions of ISO 14644-1 cleanroom standard ISO 9, or ISO 8, or ISO 5, or ISO 4, or ISO 3, or ISO 2, or ISO 1. In one embodiment, before the step of subjecting the nanofibrillar cellulose hydrogel to the heat treatment, the conditions of ISO 8 or ISO 9 are maintained. After the heat treatment maintaining aseptic conditions are even more important than between the steps of providing the nanofibrillar cellulose hydrogel and of subjecting the nanofibrillar cellulose hydrogel to the heat treatment. In one embodiment, after the step of subjecting the nanofibrillar cellulose hydrogel to the heat treatment up to the step of packaging the treated nanofibrillar cellulose hydrogel, the conditions of at least ISO 5 are maintained.

In one embodiment, the method for treating a nanofibrillar cellulose hydrogel is carried out in a continuous mode.

The present invention relates further to a nanofibrillar cellulose hydrogel obtainable by the method according to the present invention.

The present invention further relates to a nanofibrillar cellulose hydrogel, wherein the nanofibrillar cellulose hydrogel contains no colony-forming units of viable micro-organism per gram of nanofibrillar cellulose hydrogel, as measured by culturing on a growth medium, and has a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm. This kind of nanofibrillar cellulose hydrogel can be produced by the method described in this specification.

The presence of viable micro-organisms in the nanofibrillar cellulose hydrogel can be determined by culturing on a growth medium. Several protocols for determining the number of colony forming units are available.

In an embodiment, the number of colony-forming units per gram of nanofibrillar cellulose hydrogel is determined by preparing a dilution series of the hydrogel and by plating the dilution series on separate Petrifilm plates (3M) for aerobic bacteria (aerobic plate count) and for yeasts and moulds. The plates for aerobic bacteria are allowed to grow at 37° C. for 2 days and the plates for yeasts and moulds at 30° C. for 3-5 days, after which the colonies are counted. The number of colony-forming units of aerobic heterotrophs are determined by culturing the sample on plate count agar at a temperature of 37° C. for three (3) days. Alternatively, the presence of yeast and/or fungus can be determined by culturing on potato dextrose agar at a temperature of 25° C. for five (5) days. Before the measurement, the samples are diluted by ten-fold. The presence of anaerobic micro-organisms can be determined by culturing on brewer anaerobic agar for anaerobic bacterial count at a temperature of 30° C. for three (3) days in anaerobic conditions. Before the measurement, the samples are diluted ten-fold.

In an embodiment, the number of colony-forming units is determined by following the standard ISO 8784-1 (Pulp, Paper and board—Microbiological examination. Part 1: Total count of bacteria, yeast and mould based on disintegration). The results are given as the number of colony-forming units per gram of the sample.

In an embodiment, the number of colony-forming units of viable micro-organism per gram of nanofibrillar cellulose hydrogel may be measured by incubating at 37° C. for 14 days following the USP XXIV Chapter 71 sterility test.

In one embodiment, treated nanofibrillar cellulose hydrogel contains at most $10^{-1}$, or at most $10^{-3}$, or at most $10^{-6}$, colony-forming units of a viable micro-organism per gram of nanofibrillar cellulose hydrogel.

The present invention further relates to a nanofibrillar cellulose hydrogel for use in therapy, wherein the nanofibrillar cellulose hydrogel contains at most $10^{-1}$ colony-forming units of viable micro-organism per gram of nanofibrillar cellulose hydrogel, and has a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm.

In one embodiment, the nanofibrillar cellulose hydrogel for use in therapy contains at most $10^{-3}$, or at most $10^{-6}$, colony-forming units of viable micro-organism per gram of the nanofibrillar cellulose hydrogel.

The present invention further relates to a nanofibrillar cellulose hydrogel obtainable by the method according to the present invention for use in therapy.

The present invention further relates to the use of nanofibrillar cellulose hydrogel in a cosmetic product, wherein the nanofibrillar cellulose hydrogel contains no colony-forming units of viable micro-organism per gram of nanofibrillar cellulose hydrogel, as measured by culturing on a growth medium, and has a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm.

The present invention further relates to the use of nanofibrillar cellulose hydrogel obtainable by the method according to the present invention in a cosmetic product.

The present invention further relates to the use of nanofibrillar cellulose hydrogel in cell culture, wherein the nanofibrillar cellulose hydrogel contains at most $10^{-2}$ colony-forming units of viable micro-organism per gram of nanofibrillar cellulose hydrogel, and has a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm.

The present invention further relates to the use of nanofibrillar cellulose hydrogel obtainable by the method according to the present invention in cell culture.

In one embodiment, the nanofibrillar cellulose hydrogel, which is used in cell culture contains at most $10^{-3}$, or at most $10^{-6}$, colony-forming units of viable micro-organism per gram of the nanofibrillar cellulose hydrogel.

The embodiments of the invention described hereinbefore may be used in any combination with each other. Several of the embodiments may be combined together to form a further embodiment of the invention. A method, a hydrogel, a system, or a use, to which the invention is related, may comprise at least one of the embodiments of the invention described hereinbefore.

An advantage of the method according to the present invention is that the nanofibrillar cellulose hydrogel can be treated in order to reduce the number of viable micro-organisms therein without compromising, in an adverse extent, other properties such as viscosity thereof.

An advantage of the method according to the present invention is that in addition to reducing the number of viable micro-organisms in the nanofibrillar cellulose hydrogel, also any possibly present proteins are denaturated and thus inactivated.

An advantage of the method according to the present invention is that the heat treatment can easily be combined with the step of providing the nanofibrillar cellulose hydrogel as well as e.g. the packaging step thereof following the heat treatment.

An advantage of the method according to the present invention is that a nanofibrillar cellulose hydrogel can be provided for use in pharmaceutical or cosmetic applications. An advantage of the method according to the present invention is that biocides are not needed to reduce the number of viable micro-organisms in the nanofibrillar cellulose hydrogel. In some cases, depending on the end-use of the treated nanofibrillar cellulose hydrogel, a minor amount of biocide can be used in order to reach a required purity level.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

FIG. 1 illustrates a system according to one embodiment of the present invention for treating a nanofibrillar cellulose hydrogel. The system comprises a fibrillation unit 1 for providing a nanofibrillar cellulose hydrogel. The fibrillation unit is configured to fibrillate a cellulose-based raw material. The cellulose-based raw material can be e.g. cellulose pulp, which is disintegrated in e.g. a fluidizer or homogenizer.

The produced nanofibrillar cellulose hydrogel is then provided into heating apparatus 2, wherein it is subjected to a heat treatment. The heating apparatus is configured to keep the nanofibrillar cellulose hydrogel at a temperature of at least 130° C. for at least 0.5 seconds, for reducing the number of viable micro-organisms in the nanofibrillar cellulose hydrogel.

After the heat treatment, the nanofibrillar cellulose hydrogel is provided into a cooling apparatus 3, which, in this embodiment, is a separate apparatus from the heating apparatus. Alternatively, the heating apparatus could be configured to cool the nanofibrillar cellulose hydrogel to a temperature of below 30° C. in at most 120 seconds after the heat treatment.

After the step of cooling the nanofibrillar cellulose hydrogel, it can be packed for storage or for further use.

Example 1—Heat Treatment of Nanofibrillar Cellulose Hydrogel

The effect of heat treatment carried out at a high temperature for a short period of time on the properties of anionic nanofibrillar cellulose hydrogel was tested.

Firstly, bleached birch pulp (bale pulp) was TEMPO-oxidized to the oxidation level of 1030 μmol COOH/g dry pulp. So-called TEMPO-oxidation is a well-known process in the art. TEMPO-oxidation is catalytic oxidation of cellulose carried out by using a heterocyclic nitroxyl radical, i.e. 2,2,6,6-tetramethylpiperidinyl-1-oxy free radical.

After the oxidation treatment, the pulp was fibrillated to produce nanofibrillar cellulose hydrogels. The hydrogel was manufactured to a dry matter content of 1.14%. The viscosity of the nanofibrillar cellulose hydrogel was 18000 mPa·S when diluted to 0.77%.

Before subjecting the nanofibrillar cellulose hydrogel to the heat treatment, different samples were prepared by diluting with deionized water.

The following parameters were measured before and after the heat treatment: dry matter content, Brookfield viscosity, and the turbidity. Also the treated nanofibrillar cellulose hydrogels were measured for microbial growth by culturing on growth medium in a manner as above described.

The different samples were subjected to heat treatment at 131° C. for 5 seconds or 140° C. for 10 seconds. The used apparatus was MicroThermics, Lab-25 HV Hybrid, where the heat treatment is based on the use of indirect steam. Table 1 below indicates the different measured parameters and the treatment procedures.

TABLE 1

Treatment procedures and parameters

| Sample | Dilution in deionized water and treatment | Dry solids | Viscosity Brookfield 10 rpm (mPas) (Change) | | Turbidity 0.1% (NTU) | |
|---|---|---|---|---|---|---|
| | | | Before | After | Before | After |
| Sample 1 | 2:1/5 sec 131° C. | 0.51% | 5725 | 2180 (−62%) | 21.0 | 20.3 |
| Sample 2 | no dilution 5 sec 131° C. | 0.77% | 16475 | 12705 (−23%) | 18.3 | 18.3 |
| Sample 3 | 2:1 10 sec 140° C. | 0.51% | 5430 | 3005 (−45%) | 20.0 | 19.0 |

When measuring the microbial growth in of the nanofibrillar cellulose hydrogel before being subjected to heat treatment, it was noticed that the hydrogel contained a lot of viable micro-organisms, especially aerobic bacteria and aerobic yeast and mould. The culturing plates were full of microbial growth. The results from microbial growth tests after the heat treatment indicated that all aerobic bacteria as well as aerobic yeast and moulds were killed as a result of the heat treatment. Thus, the treatment of nanofibrillar cellulose hydrogel at a high temperature for a rather short period of time provides the effect of reducing the number of viable micro-organisms but does not affect the viscosity of the nanofibrillar cellulose hydrogel to an adverse extent when the dry matter content of the nanofibrillar cellulose hydrogel is at least 0.6%.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for treating a nanofibrillar cellulose hydrogel, wherein the method comprises the steps of:
   providing a nanofibrillar cellulose hydrogel having a dry-matter content of at least 0.6 weight-%; and
   subjecting the nanofibrillar cellulose hydrogel to a heat treatment, wherein the heat treatment comprises keeping the nanofibrillar cellulose hydrogel at a temperature of 130-150° C. for at least 0.5 seconds and for at most 30 seconds, for reducing the number of viable micro-organisms in the nanofibrillar cellulose hydrogel.

2. The method of claim 1, wherein the step of providing a nanofibrillar cellulose hydrogel comprises providing a nanofibrillar cellulose hydrogel having a dry-matter content of at least 0.7 weight-%.

3. The method of claim 1, wherein the step of providing a nanofibrillar cellulose hydrogel comprises providing a nanofibrillar cellulose hydrogel having a dry-matter content of at most 4 weight-%.

4. The method of claim 1, wherein the heat treatment comprises:
   heating the nanofibrillar cellulose hydrogel up to a temperature of at least 130° C. for at most 5 seconds.

5. The method of claim 1, wherein the method comprises, after the heat treatment, the step of:
   cooling the nanofibrillar cellulose hydrogel to a temperature of below 30° C. in at most 120 seconds.

6. The method of claim 1, wherein the number of viable micro-organisms in the nanofibrillar cellulose hydrogel is reduced by a factor of at least $10^3$.

7. The method of claim 1, wherein the heat treatment is carried out by contacting the nanofibrillar cellulose hydrogel with steam.

8. The method of claim 1, wherein the heat treatment is carried out in at least one heat exchanger.

9. The method of claim 1, wherein the nanofibrillar cellulose is native nanofibrillar cellulose or anionic nanofibrillar cellulose.

10. The method of claim 1, wherein the method comprises providing a nanofibrillar cellulose hydrogel having a viscosity of 2000-40000 mPa·s as measured at a 0.8% (w/w) concentration of the nanofibrillar cellulose in water with a Brookfield viscometer at a temperature of 20° C., with a vane spindle and a measuring speed of 10 rpm.

11. The method of claim 1, wherein the method comprises providing a nanofibrillar cellulose hydrogel with a turbidity value of at most 200 NTU, or at most 90 NTU, or at most 40 NTU, as measured at a 0.1% (w/w) concentration of the nanofibrillar cellulose in water.

12. The method of claim 1, wherein the viscosity of the nanofibrillar cellulose hydrogel, after the heat treatment, differs by at most 50% from the viscosity of the nanofibrillar cellulose hydrogel before the heat treatment, when the viscosity after the heat treatment is measured in the same dry matter content of at least 0.6 weight-%.

13. The method of claim 1, wherein providing the nanofibrillar cellulose hydrogel comprises fibrillation of a cellulose-based raw material.

14. The method of claim 1, wherein providing the nanofibrillar cellulose hydrogel and subjecting the nanofibrillar cellulose hydrogel to a heat treatment are carried out while maintaining aseptic conditions.

* * * * *